(12) United States Patent
Tojima

(10) Patent No.: US 11,063,887 B2
(45) Date of Patent: Jul. 13, 2021

(54) INFORMATION PROCESSING APPARATUS, USER TERMINAL APPARATUS, AND CONTROL METHOD

(71) Applicant: SHARP KABUSHIKI KAISHA, Sakai (JP)

(72) Inventor: Akira Tojima, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/564,414

(22) Filed: Sep. 9, 2019

(65) Prior Publication Data
US 2020/0092232 A1   Mar. 19, 2020

(30) Foreign Application Priority Data

Sep. 13, 2018 (JP) .............................. JP2018-171307
Mar. 12, 2019 (JP) .............................. JP2019-044571

(51) Int. Cl.
| | |
|---|---|
| *G06F 15/16* | (2006.01) |
| *G06F 9/54* | (2006.01) |
| *H04L 29/06* | (2006.01) |
| *H04L 12/58* | (2006.01) |
| *G09B 7/00* | (2006.01) |

(52) U.S. Cl.
CPC ............... *H04L 51/02* (2013.01); *G09B 7/00* (2013.01); *H04L 51/046* (2013.01); *H04L 51/26* (2013.01)

(58) Field of Classification Search
CPC ....................................................... H04L 67/10
USPC ......................................................... 709/206
See application file for complete search history.

(56) References Cited

U.S. PATENT DOCUMENTS

| | | | | |
|---|---|---|---|---|
| 8,019,753 B2* | 9/2011 | Podgorny | .............. | G06Q 10/10 707/722 |
| 8,612,306 B1* | 12/2013 | Mukherjee | ......... | G06Q 30/0627 705/26.5 |
| 8,983,962 B2* | 3/2015 | Nakazawa | .......... | G06F 16/3329 707/738 |
| 9,736,268 B1* | 8/2017 | Tsay | ...................... | H04L 67/327 |
| 10,162,853 B2* | 12/2018 | Venkataraman | ........ | G10L 15/22 |
| 10,404,636 B2* | 9/2019 | Rodriguez | .............. | H04L 65/60 |
| 10,504,508 B2* | 12/2019 | Fujii | ....................... | G10L 15/22 |
| 10,515,155 B2* | 12/2019 | Bachrach | ............. | G06N 3/0454 |

(Continued)

FOREIGN PATENT DOCUMENTS

JP         2003-044487 A         2/2003

*Primary Examiner* — Hamza N Algibhah
(74) *Attorney, Agent, or Firm* — ScienBiziP, P.C.

(57) ABSTRACT

In an information processing apparatus, a question information acquisition unit acquires question information from a user terminal apparatus. A chat data acquisition unit acquires chat data including one or more pieces of second question data and one or more pieces of second answer data. Each piece of second question data is a collection of one or more pieces of similar first question data selected from FAQ data including the pieces of first question data and first answer data thereto. The second answer data is data obtained by simplifying corresponding one or more pieces of first answer data. An answer data acquisition unit acquires a piece of second answer data corresponding to a piece of second question data identical or similar to the question information. A transmission unit transmits the piece of second answer data acquired by the answer data acquisition unit to the user terminal apparatus.

5 Claims, 10 Drawing Sheets

(56) References Cited

U.S. PATENT DOCUMENTS

| | | | |
|---|---|---|---|
| 10,534,788 B2* | 1/2020 | Agarwal | G06F 3/0484 |
| 10,599,391 B2* | 3/2020 | Mailey | G06F 40/205 |
| 10,629,089 B2* | 4/2020 | Ahn | G09B 5/12 |
| 2010/0076998 A1* | 3/2010 | Podgorny | G06Q 10/10 |
| 2011/0145333 A1* | 6/2011 | Hind | G06Q 30/02 |
| | | | 709/205 |
| 2015/0235240 A1* | 8/2015 | Chang | G06Q 30/0202 |
| | | | 705/7.31 |
| 2018/0052664 A1* | 2/2018 | Zhang | G06F 16/90332 |
| 2018/0053119 A1* | 2/2018 | Zeng | G06F 40/205 |
| 2018/0054464 A1* | 2/2018 | Zhang | H04L 65/1096 |
| 2018/0054523 A1* | 2/2018 | Zhang | G06N 5/04 |
| 2018/0083901 A1* | 3/2018 | McGregor, Jr. | H04L 51/32 |
| 2018/0367483 A1* | 12/2018 | Rodriguez | H04L 51/046 |
| 2018/0367484 A1* | 12/2018 | Rodriguez | H04L 51/02 |
| 2019/0251165 A1* | 8/2019 | Bachrach | G06F 40/30 |
| 2020/0042642 A1* | 2/2020 | Bakis | G06F 16/243 |

* cited by examiner

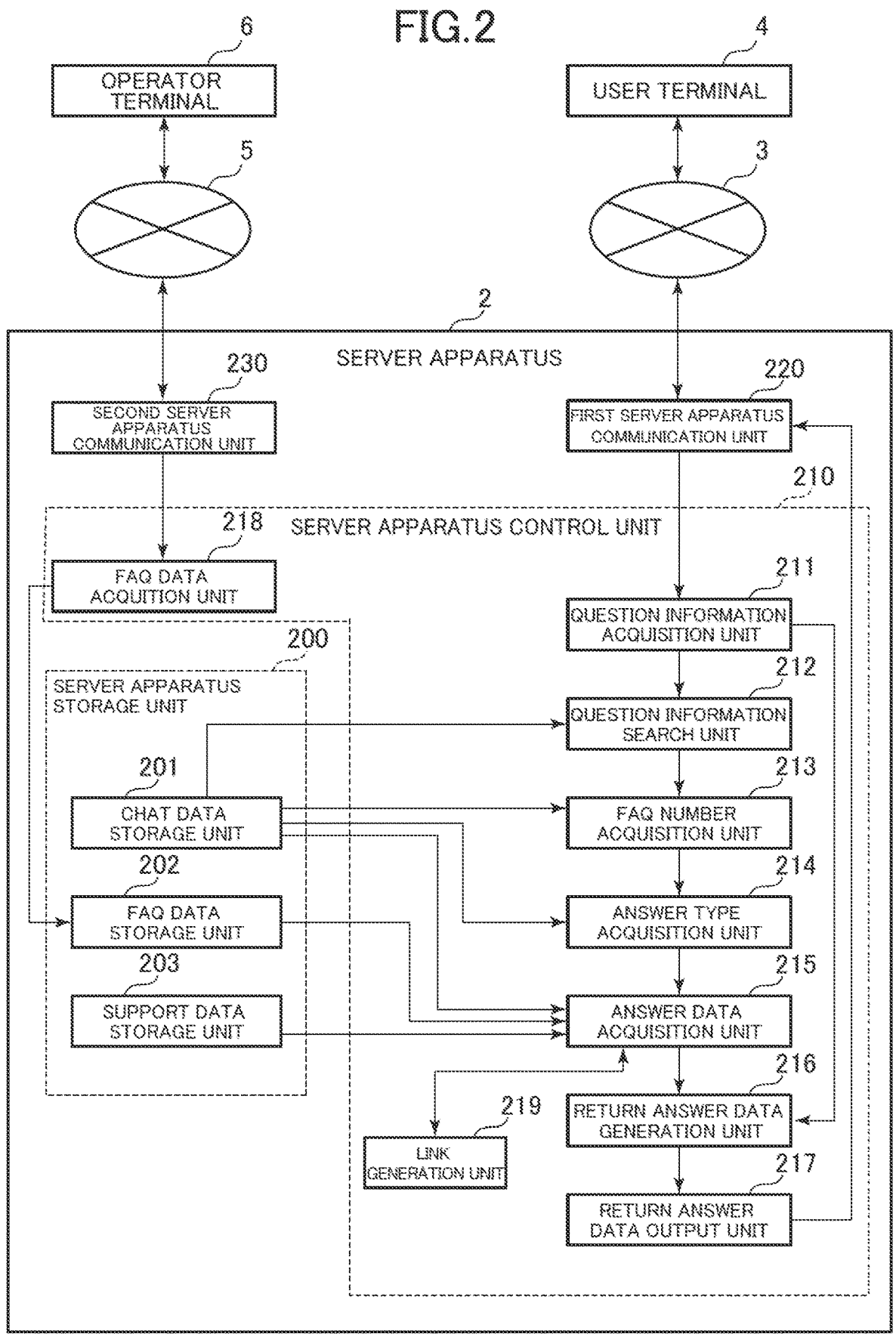

FIG.3A

FAQ DATA

| FAQ NUMBER | ORIGINAL QUESTION DATA | ORIGINAL ANSWER DATA | MODEL NAME INFORMATION |
|---|---|---|---|
| 110 | Q1-1 | A1 | AAA, BBB, CCC, DDD, EEE |
| 111 | Q1-1 | A2 | MMM, PPP, RRR, |
| 112 | Q1-2 | A3 | YYY, ZZZ |
| 113 | Q2 | A4 | AAA, BBB, EEE, LLL |

FIG.3B

CHAT DATA

| FAQ NUMBER LIST | CHAT QUESTION DATA | CHAT ANSWER DATA | ANSWER TYPE INFORMATION |
|---|---|---|---|
| 110, 111, 112 | CQ1 | CA1 | C |
| 113 | CQ2 | CA2 | B |

FIG.3C

| ANSWER TYPE INFORMATION | ADDITION RULE | ADDITIONAL ANSWER DATA | LINK TARGET |
|---|---|---|---|
| A | EMPLOY CHAT ANSWER DATA OR ORIGINAL ANSWER DATA AS ANSWER RESULT DATA | NONE | NONE |
| B | INSERT ADDITIONAL ANSWER DATA BEFORE CHAT ANSWER DATA AND EMPLOY RESULTANT DATA AS ANSWER RESULT DATA, AND FURTHER ADD LINK TARGET INFORMATION THERETO | <Check whether model is correct> Applicable Models | PUT, IN APPLICABLE MODELS, LINK TO APPLICABLE MODEL INFORMATION PAGE |
| C | EMPLOY ADDITIONAL ANSWER DATA, INSTEAD OF CHAT ANSWER DATA, AS ANSWER RESULT DATA AND ADD LINK TARGET INFORMATION | Answer depends on the model. See here. | PUT, IN "here", LINK TO MODEL SELECTION PAGE |

\<A\> DISPLAY ORIGINAL ANSWER DATA IN FAQ DATA
\<C\> DISPLAY CHAT ANSWER DATA

\<B\> GENERATE SUMMARY, AND PUT LINK TO
FURTHER DETAILED FAQ DATA

FIG. 7   <B> EXAMPLE OF CHAT SCREEN DISPLAYED FOR LIMITED MODELS
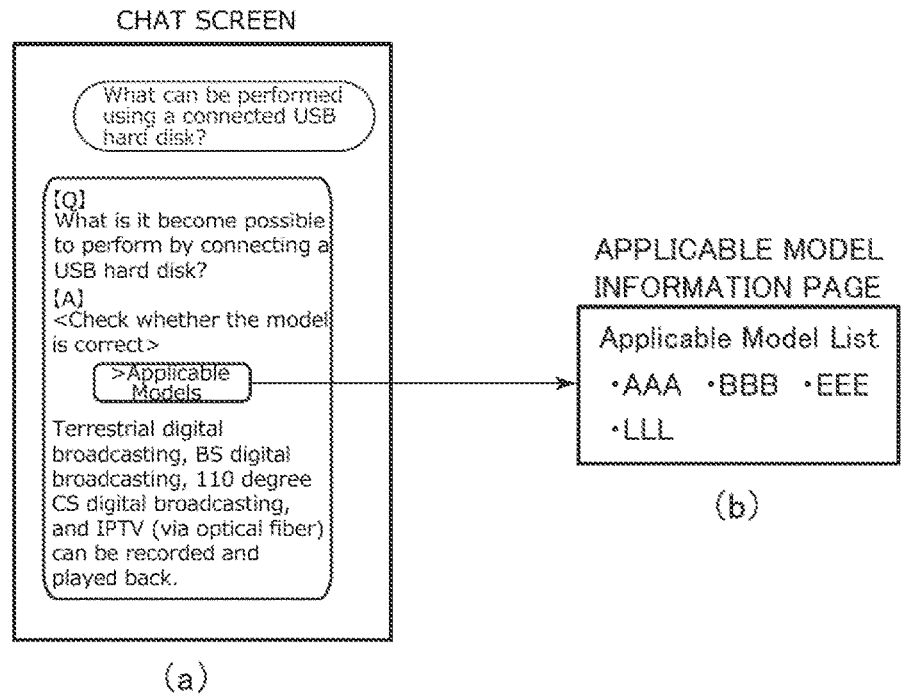
FIG. 8   <D> PUT LINK TO MODEL-SPECIFIC SUPPORT SELECTION PAGE
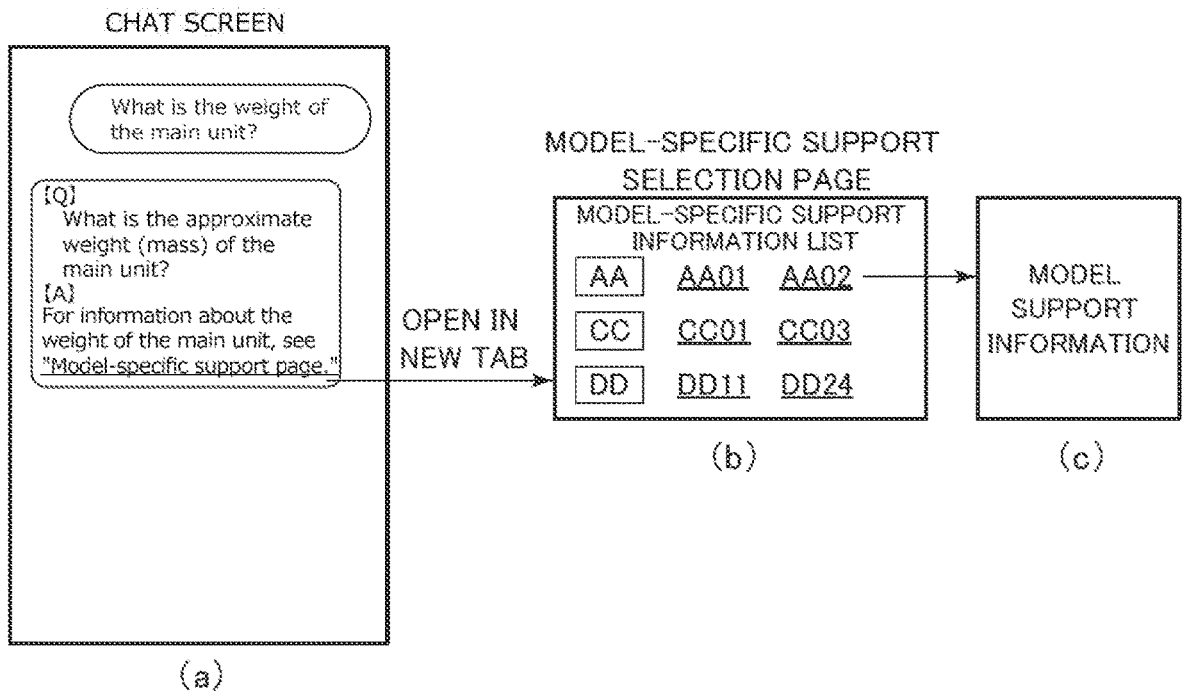

FIG.9  <E> AUTOMATICALLY GENERATE MODEL SELECTION PAGE
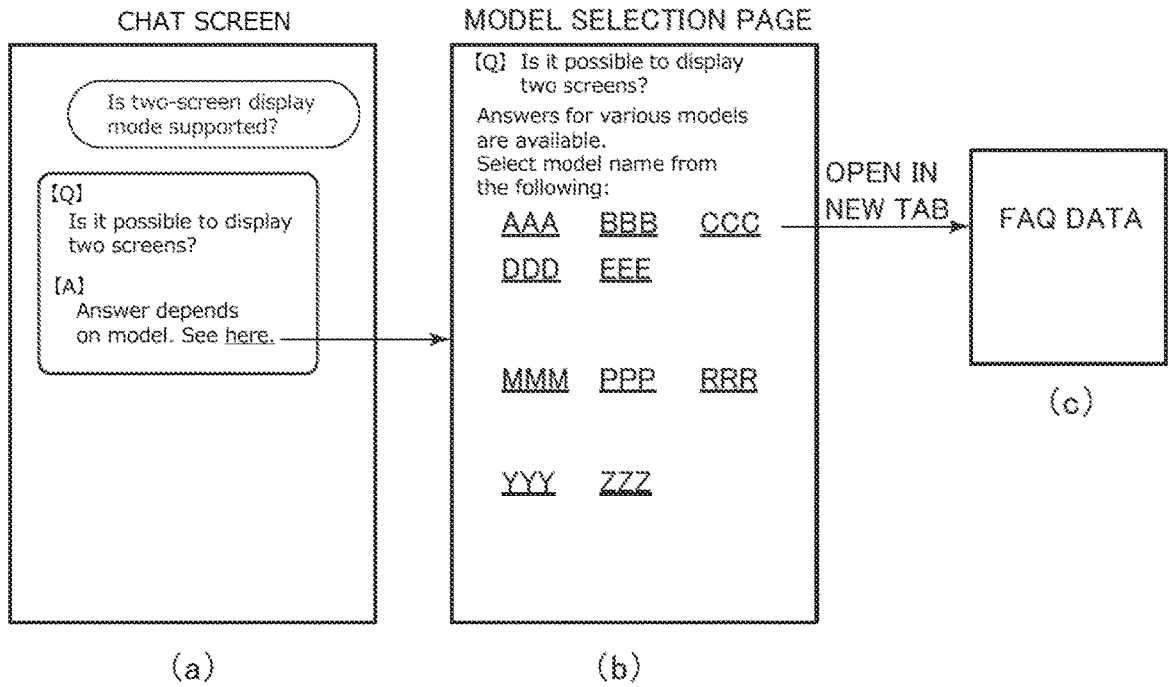
FIG.10
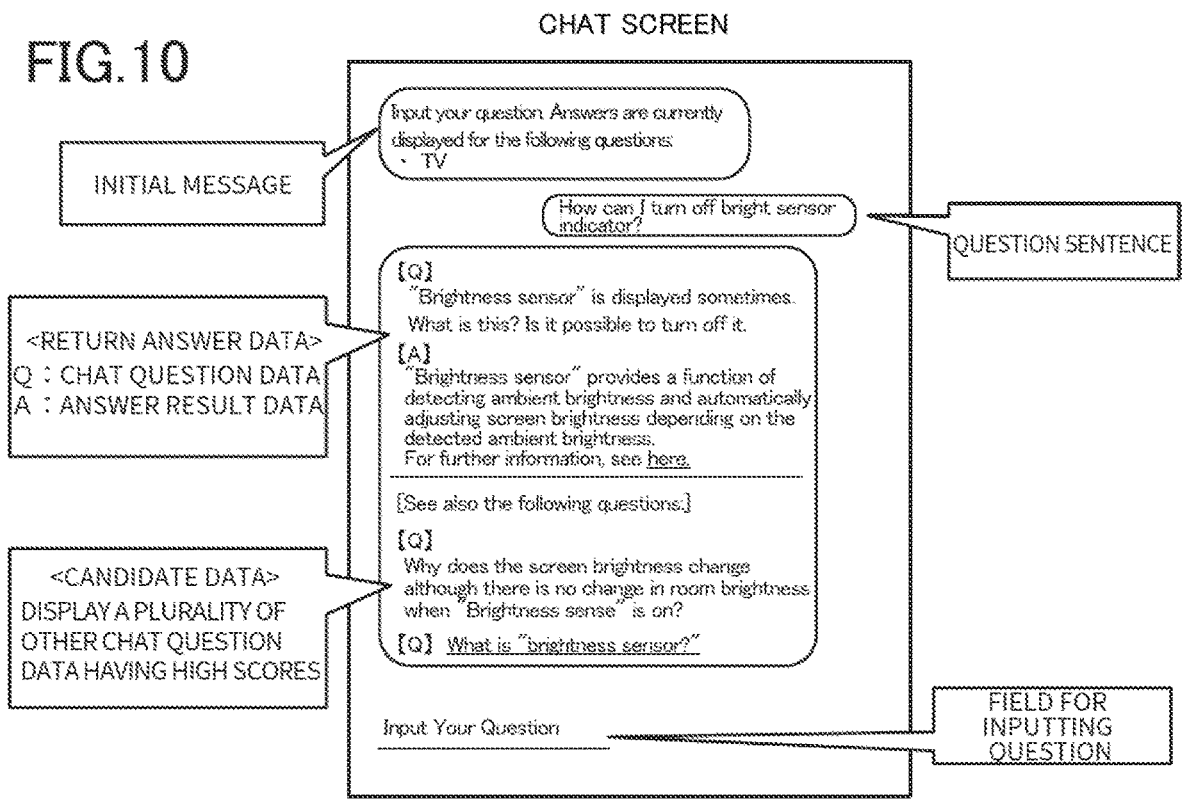

FIG. 11

CHAT DATA (IN <>, LINK TO SPECIFIED MANAGEMENT ID IS PUT)

| MANAGEMENT ID | FAQ NUMBER LIST | CHAT QUESTION DATA | CHAT ANSWER DATA | ANSWER TYPE INFORMATION |
|---|---|---|---|---|
| 200 | 115 | Power does not turn on | Check the status of power lamp<br><br>· The lamp is off <201><br>· The lamp is blinking <202> | G |
| 201 | | The power lamp is off | Power is probably not supplied to the device. Check the power switch and the power plug. Is the situation improved?<br><br>· The situation is improved <203><br>· The situation is not improved <204> | H |
| 202 | | The power lamp is blinking | There is a possibility that the main unit does not operate normally. Press the power switch on the main unit. Confirm that the power switch turns off. Thereafter, reinsert the power plug. Is the situation improved?<br><br>· The situation is improved <203><br>· The situation is not improved <204> | H |
| 203 | | The situation is improved | When the situation is improved, you can continue to use your device. If the same situation occurs repeatedly, apply for repair. | I |
| 204 | | The situation is not improved | Repair is necessary. Apply for repair. | I |

FIG. 12

| ANSWER TYPE INFORMATION | ADDITION RULE | ADDITIONAL ANSWER DATA | LINK TARGET |
|---|---|---|---|
| G | · DO NOT DISPLAY QUESTIONNAIRE SCREEN (PERFORM THE OTHER PROCESSING IN THE SAME MANNER AS WITH ANSWER TYPE INFORMATION A) | PUT LINK TO MANAGEMENT ID | TO CHAT DATA HAVING THE CORRESPONDING MANAGE ID |
| H | · DO NOT DISPLAY QUESTIONNAIRE SCREEN<br>· DO NOT DISPLAY CHAT QUESTION DATA TOGETHER WITH CHAT ANSWER DATA<br>· DO NOT SEARCH FOR INPUT CHARACTER STRING | PUT LINK TO MANAGEMENT ID | TO CHAT DATA HAVING THE CORRESPONDING MANAGE ID |
| I | · DISPLAY QUESTIONNAIRE SCREEN<br>· DO NOT DISPLAY CHAT QUESTION DATA TOGETHER WITH CHAT ANSWER DATA<br>· DO NOT SEARCH FOR INPUT CHARACTER STRING | NONE | NONE |

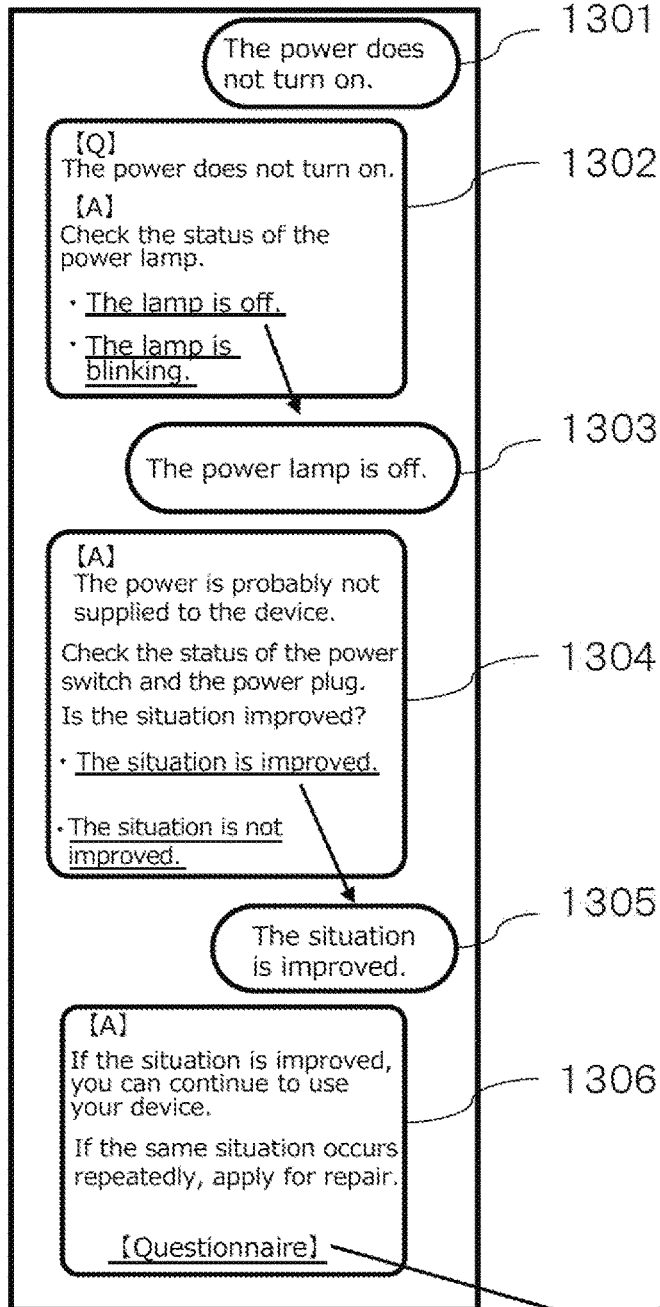

INFORMATION PROCESSING APPARATUS, USER TERMINAL APPARATUS, AND CONTROL METHOD

BACKGROUND

1. Field

The present disclosure relates to an information processing apparatus, a user terminal apparatus, and a control method.

2. Description of the Related Art

For example, Japanese Unexamined Patent Application Publication No. 2003-44487 (published on Feb. 14, 2003) discloses a technique relating to a product support system in which a server manages a question input via a user terminal and an answer to the question provided from an answer terminal. The server apparatus provides, to the public at a support web site, a question-and-answer list in which question-and-answer pairs are listed in order from the most frequently asked one by users to the least frequently asked one, thereby making it possible to provide the question-and-answer list depending on the occurrence tendency of questions asked by users.

The present disclosure provides a support system capable of providing an appropriate answer more efficiently, for example, in response to a query about a product from a user terminal via the Internet.

SUMMARY (1) In an aspect, the present disclosure provides an information processing apparatus including a question information acquisition unit configured to acquire question information from a user terminal apparatus, a chat data acquisition unit configured to acquire chat data including one or more pieces of second question data each being a collection of one or more pieces of identical or similar first question data selected from a plurality of pieces of first question data included in FAQ data including the plurality of pieces of first question data and a plurality of first answer data corresponding to the respective pieces of first question data, the chat data further including one or more pieces of second answer data obtained by simplifying a content of corresponding one or more pieces of first answer data, the one or more pieces of second question data each being associated with a piece of second answer data, an answer data acquisition unit configured to acquire a piece of second answer data corresponding to a piece of second question data identical or similar to the question information, and a transmission unit configured to transmit the piece of second answer data acquired by the answer data acquisition unit to the user terminal apparatus.

(2) In an aspect, the present disclosure provides a user terminal apparatus including an input unit configured to input a question sentence, a transmission unit configured to transmit the question sentence to an information processing apparatus, a reception unit configured to receive, from the information processing apparatus, a piece of second question data being a collection of one or more pieces of identical or similar first question data selected from a plurality of pieces of first question data included in FAQ data including the plurality of pieces of first question data and a plurality of first answer data corresponding to the respective pieces of first question data, and a piece of second answer data obtained by simplifying a content of corresponding one or more pieces of first answer data, and a display unit configured to display the question sentence, the piece of second question data received by the reception unit, and the piece of second answer data.

(3) In an aspect, the present disclosure provides a method of controlling an information processing apparatus, including acquiring question information from a user terminal apparatus, acquiring chat data including one or more pieces of second question data each being a collection of one or more pieces of identical or similar first question data selected from a plurality of pieces of first question data included in FAQ data including the plurality of pieces of first question data and a plurality of first answer data corresponding to the respective pieces of first question data, the chat data further including one or more pieces of second answer data obtained by simplifying a content of corresponding one or more pieces of first answer data, the one or more pieces of second question data each being associated with a piece of second answer data, acquiring a piece of second answer data corresponding to the piece of second question data identical or similar to the question information, and transmitting the piece of second answer data to the user terminal apparatus.

BRIEF DESCRIPTION OF THE DRAWINGS

FIG. 2 is a diagram illustrating an example of a functional configuration of a server apparatus shown in FIG. 1;

FIG. 3A is a diagram showing an example of a configuration of a storage unit of a server apparatus shown in FIG. 1;

FIG. 3B is a diagram showing an example of a configuration of a storage unit of a server apparatus shown in FIG. 1;

FIG. 3C is a diagram showing an example of a configuration of a storage unit of a server apparatus shown in FIG. 1;

FIG. 7 is a diagram illustrating a specific example of a web page according to an embodiment of the present disclosure;

FIG. 8 is a diagram illustrating a specific example of a web page according to an embodiment of the present disclosure;

FIG. 9 is a diagram illustrating a specific example of a web page according to an embodiment of the present disclosure;

FIG. 10 is a diagram illustrating a specific example of a web page according to an embodiment of the present disclosure;

FIG. 11 is a diagram illustrating an example of a configuration of chat data in a support system according to a modification of an embodiment of the present disclosure;

FIG. 12 is a diagram illustrating examples of various kinds of information indicating contents of processing performed by a server apparatus in a support system according to a modification of an embodiment of the present disclosure; and FIG. 13 is a diagram illustrating a specific example of a web page in a modification of a support system 1.

DESCRIPTION OF THE EMBODIMENTS

Figure 1:
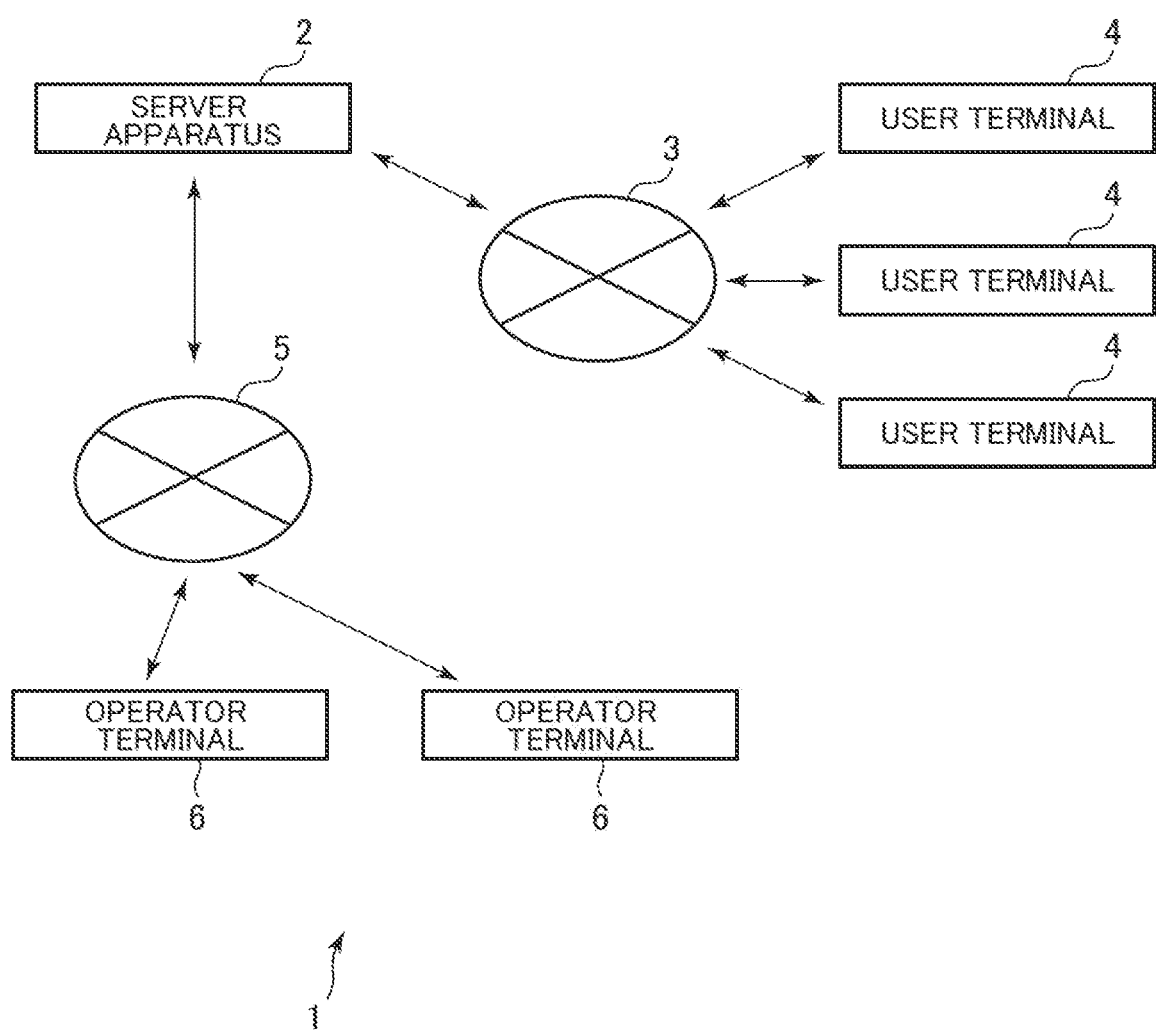
FIG. 1 is a diagram illustrating a system configuration of a support system according to an aspect the present disclosure.

Embodiments the present disclosure are described below with reference to drawings. In the drawings, the same or equivalent elements are denoted by the same reference numerals, and a duplicate description thereof is omitted.

FIG. 1 is a diagram illustrating a system configuration of a support system according to an aspect of the present disclosure.

As shown in FIG. 1, a support system 1 includes, for example, a server apparatus 2, a wide area network 3, a plurality of user terminals 4, a narrow area network 5, and a plurality of operator terminals 6.

The plurality of user terminals 4 are connected to the server apparatus 2 via the wide area network 3 such as the Internet so as to be capable of inputting a question about a product or the like via a web page of a user support site provided by the server apparatus 2. Furthermore, each user terminal apparatus 4 can receive, via a web page of the user support site, answer data generated in response to a question by the server apparatus 2. The user terminal 4 may be a terminal on which a browser operates. For example, the user terminal 4 may be a smartphone, a tablet device, a PC, a TV or the like.

The plurality of operator terminals 6 are connected to the server apparatus 2 via the narrow area network 5 such as a LAN (Local Area Network). At the operator terminals 6, a question about a product or the like asked to a call center via the wide area network 3 or a telephone system and an answer thereto, and product information such as a model name of the product related to the question are input in a predetermined format provided by the server apparatus 2. The input question and answer are stored as FAQ data in the server apparatus 2. Some or all of the operator terminals 6 may be connected to the server apparatus 2 via the wide area network 3.

When a user accesses the support system 1, for example, from a user terminal 4 via the wide area network 3, the support system 1 may response not only such that, as with a conventional system, a user is prompted to input a model name and then information related to the product is provided, and may also response such that a user is first prompted to input a question sentence, and then an answer to the question sentence is provided interactively on a chat screen, for example, in a so-called chat-based interactive manner. The chat screen is, for example, a screen such as that shown in FIG. 5 on which question data and answer data retrieved as a result of a search based on the question sentence input by the user are displayed as an answer result.

FIG. 2 is a diagram showing an example of a functional configuration of the server apparatus 2 according to an embodiment of the present disclosure.

The server apparatus 2 includes, as shown in FIG. 2, a server apparatus storage unit 200, a server apparatus control unit 210, a first server apparatus communication unit 220, and a second server apparatus communication unit 230. For example, the server apparatus control unit 210 executes various kinds of information processing according to programs stored in the server apparatus storage unit 200.

The first server apparatus communication unit 220 functions as a first server apparatus reception unit configured to receive various kinds of information, such as, a question sentence about a product or the like from each user terminal 4 via the wide area network 3. The first server apparatus communication unit 220 also functions as a first server apparatus transmission unit configured to transmit various kinds of data such as web page answer screen data, question screen data, and/or the like described, for example, in HTML (Hyper Text Markup Language) to the user terminal 4 via the wide area network 3. Note that here and elsewhere, the expression "the user terminal 4" is used to describe one or more not-specific user terminals 4 unless a confusion occurs.

The second server apparatus communication unit 230 functions, for example, a second server apparatus transmission unit configured to transmit data of a database input screen for inputting a question sentence about a product or the like, an answer sentence, a product model name, and/or the like to the operator terminal 6 via the narrow area network 5. Note that here and elsewhere, the expression "the operation terminal 6" is used to describe one or more not-specific operation terminals 6 unless a confusion occurs. The second server apparatus communication unit 230 also functions as a second server apparatus reception unit configured to receive various kinds of information such as a question sentence about a product or the like, an answer sentence, a model name of the product and/or the like from the operator terminal 6 via the narrow area network 5. The second server apparatus communication unit 230 may function to transmit/receive data to/from the operator terminal 6, for example, via the wide area network 3.

The server apparatus storage unit 200 includes a chat data storage unit 201, a FAQ data storage unit 202, and a support data storage unit 203.

In the FAQ data storage unit 202, question sentences asked to a call center configured to accept questions about products or the like via the wide area network 3 or a telephone system and answer sentences to the question sentences are stored. The question sentences and the answer sentences are stored in the form of character strings such as sentences or words representing contents of the respective questions and answers. Furthermore, in the FAQ data storage unit 202 in addition to question sentences and answer sentences, product information for identifying a product such as a model name of the product that is the subject of the question, the date and time when the question sentence is input, the date and time when the answer sentence is input, and the like are stored in association with each other. Note that the data stored in the FAQ data storage unit 202 includes data input in a predetermined format, for example, via an operator terminal 6.

The FAQ data storage unit 202 stores a plurality of pieces of first question data (original question data) and first answer data (original answer data) corresponding to the respective pieces of the first question data. More specifically, for example, as shown in FIG. 3A, the FAQ data storage unit 202 stores data such that original question data of a question sentence about a product asked by a user, original answer data of an answer sentence corresponding to the original question data, model name information indicating a model name of the product, and a FAQ number identifying each piece of question data are stored in association with each other.

Now that the original question data and the original answer data shown in FIG. 3A are input, for example, in a predetermined format via the operator terminal 6. More specifically, original question data is obtained, for example, by inputting, at the operator terminal 6, a question sentence about a product or the like asked to a call center via the wide area network 3 or the telephone system. For example, "Q1-1", "Q1-2", and "Q2-1" in the original question data in FIG. 3A are each character string data of a question sentence or a word included in the question sentence about a product inquired to a call center. More specifically, "Q1-1" of the original question data is a character string "Is displaying in a two-screen mode supported?", while "Q1-2" of the original question data is "Is it possible to display two screens?".

Original answer data is, for example, an answer sentence returned from a call center in response to a question asked by a user to the call center. Furthermore, a character string representing the answer sentence returned from the call center is input, at the operator terminal 6, by an operator thereby storing the original answer data. For example, A1 and A2 of the original answer data in FIG. 3A each are a character string of an answer sentence, an address of a web page or moving image data indicating the answer contents, data indicating an access destination to another answer sentence, or the like.

Note that the original question data may be obtained, for example, by shaping and organizing sentences of frequently asked questions selected from question sentences about products or the like inquired to a call center. The original answer data may be, for example, data obtained by shaping and organizing answer sentences corresponding to frequently asked question sentences. Note that the original question data and the original answer data may be, for example, so-called FAQ data provided as "frequently asked questions" on web pages related to various products.

The FAQ data storage unit 202 stores data, for example, such that each one piece of original question data is stored in association with one FAQ number and at least one piece of original answer data. Furthermore, the FAQ data storage unit 202 stores data such that in a case where there are a plurality of pieces of different original answer data for the same one piece of original question data, different FAQ numbers are assigned to the respective pieces of original question data corresponding to the pieces of different original answer data. Furthermore, the FAQ data storage unit 202 also stores model name information indicating, for example, a model name of a product assigned to one FAQ number and related to a piece of original question data and a piece of original answer data.

The chat data storage unit 201 stores chat data generated based on various kinds of data stored in the FAQ data storage unit 202. The chat data includes second question data (chat question data) obtained by collecting a plurality of pieces of similar first question data from the FAQ data, and second answer data (chat answer data) obtained by simplifying the contents of the first answer data in the FAQ data. More specifically, for example, as shown in FIG. 3B, the chat data storage unit 201 stores a FAQ number list, chat question data, chat answer data, and answer type information in association with one another.

Hereinafter, phrases including "chart" such as the chat data storage unit 201, chat data, chat question data, chat answer data, etc. are used in describing a situation in which an answer is provided to a user terminal 4 in a chat-based manner via a chat screen. However, the present disclosure is not limited to using such a chat screen. For example, a screen of a form other than the chat screen may be used. Furthermore, an answer may be provided to a user terminal 4 via mail or may be provided via voice.

Chat question data is, for example, a collection of similar original question data selected from the original question data in the FAQ data storage unit 202. More specifically, for example, when the original question data "Q1-1" in the FAQ data storage unit 202 shown in FIG. 3A is a character string "Is displaying in a two-screen mode supported?", while "Q1-2" of the original question data is a character string "Is it possible to display two screens?", these two pieces of original question data Q1-1 and Q1-2 are combined into collectively simplified one piece of chat question data CQ1 "Is it possible to display two screens?", and stored in the chat data storage unit 201. The chat question data may be the same character string as the original question data.

The chat answer data is, for example, chat answer data generated based on the original answer data in the FAQ data storage unit 202. The chat answer data is specifically a summary sentence obtained by summarizing an answer sentence of original answer data. For example, a character string including a specified number of characters starting from the beginning of an answer sentence of original answer data may be extracted and the extracted character string may be used as the summary sentence. Furthermore, the chat answer data is a character string of an answer sentence having a length that can be d splayed within one page on the chart screen without being scrolled. The chart answer data may be data including link target information pointing to a web page where original answer data is available.

The FAQ number list describes, for example, FAQ, numbers corresponding to original question data associated with chat question data. In the chat data storage unit 201, in a case where the chat question data is a collection of a plurality of pieces of original question data, FAQ numbers corresponding to respective pieces of original question data are described in the FAQ number list.

The answer type information represents whether there is additional answer data added to the chat answer data as will be described in detail later.

The support data storage unit 203 stores various kinds of information and data related to products, such as video data illustrating how to handle a product, optional items related to the product, an instruction manual, product information, a support page for diagnosing whether or not there is a failure, and/or the like.

Although the server apparatus 2 includes the chat data storage unit 201 and the FAQ data storage unit 202 which are provided separately as shown in FIG. 2, these two storage units may be integrated in one storage unit.

The server apparatus control unit 210 centrally controls components of the server apparatus 2. Details of the server apparatus control unit 210 will be described below.

Server Apparatus Control Unit 210

As shown in FIG. 2, the server apparatus control unit 210 includes a question information acquisition unit 211, a question information search unit 212, a FAQ number acquisition unit 213, an answer type acquisition unit 214, an answer data acquisition unit 215, a return answer data generation unit 216, a return answer data output unit 217, a FAQ data acquisition unit 218, and a link generation unit 219.

The FAQ data acquisition unit 218 acquires data such as a question sentence, an answer sentence, and a model name of a product, from the operator terminal 6 via the second server apparatus communication unit 230, and is stored in the FAQ data storage unit 202.

The question information acquisition unit 211 acquires question information which is issued from the user terminal 4 or other external terminals and which is received via the first server apparatus communication unit 220. More specifically, the question information acquisition unit 211 acquires a character string of a question sentence as question information. The question information acquisition unit 211 may acquire not only the question information from the user terminal 4 or other external terminals but also other various information from the user terminal 4.

The question information search unit 212 acquires chat data including, for example, chat question data and chat answer data stored in the chat data storage unit 201, and the question information search unit 212 searches the chat question data stored in the chat data storage unit 201 for chat question data identical or similar to the question information acquired by the question information acquisition unit 211.

More specifically, for example, the question information search unit 212 makes segmentation such that the character string of the question information and the character string of the chat question data in the chat data storage unit 201 are respectively segmented into word sequences, and the question information search unit 212 searches for chat question data which includes a largest number of words appearing in the character string of the question information. For example, the question information search unit 212 may assign weights to the respective segmented words, determine the score by calculating the weighted total number of words appearing in the character string of the question information, and employ chat question data with the highest score. Note that a plurality of pieces of chat question data having a score equal to or higher than a predetermined value may be searched for. An example of a method of determining a similarity degree among a plurality of sentences has been described above. However, the present disclosure is not limited to the example described above, but various other known methods may be employed, although a further description thereof is omitted.

For example, the FA number acquisition unit 213 acquires, from the FAQ number list, a FAQ number corresponding to chat question data in the chat data storage unit 201 retrieved by the question information search unit 212. More specifically, for example, in a case where the question information search unit 212 retrieves chat question data "CQ1", the FAQ number acquisition unit 213 acquires three FAQ numbers "110", "111", and "112" from the FAQ number list as shown in FIG. 3B.

The answer type acquisition unit 214 acquires, for example, answer type information corresponding to the chat question data retrieved by the question information search unit 212. More specifically, for example, in a case where chat question data "CQ1" is retrieved, the answer type acquisition unit 214 acquires "C" as the answer type information as illustrated in FIG. 3B.

The answer data acquisition unit 215 performs processing based on an addition rule corresponding to the answer type information acquired by the answer type acquisition unit 214 thereby acquiring answer data. As shown in FIG. 3C, the addition rule describes a content of processing to be performed by the answer data acquisition unit 215 depending on the answer type information, and the answer data acquisition unit 215 performs the processing according to the addition rule.

For example, when the answer type information indicates "A", the answer data acquisition unit 215 performs processing based on the addition rule shown in FIG. 3C thereby acquiring, from the chat data storage unit 201 as answer result data, chat answer data corresponding to the chat question data retrieved by the question information search unit 212. More specifically, for example, as shown in FIG. 3B, in a case where "CQ1" is retrieved as chat question data by the question information search unit 212, the answer data acquisition unit 215 acquires, as answer result data, a character string of answer data corresponding to "CA1" of the chat answer data.

When the answer type information indicates, for example, "A", the answer data acquisition unit 215 may perform processing based on an addition rule shown in FIG. 3C, and may acquire, from the FAQ data storage unit 202 as answer result data, original answer data corresponding to a FAQ number acquired by the FAQ number acquisition unit 213. More specifically, for example, as shown in FIG. 3B, in a case where "CQ2" is retrieved as chat question data by the question information search unit 212, the FAQ number acquisition unit 213 acquires "113" as the FAQ number. Then, the answer data acquisition unit 215 acquires, as answer result data, a character string of answer data corresponding to "A4" of original answer data corresponding to the FAQ number "113".

For example, in a case where the answer type information indicates "B", the answer data acquisition unit 215 performs processing based on an addition rule shown in FIG. 3C thereby acquiring answer result data obtained by inserting additional answer data before chat answer data corresponding to the chat question data retrieved by the question information search unit 212. More specifically, for example, as shown in FIG. 3C, the answer data acquisition unit 215 acquires character strings "Check whether the model is correct" and "Applicable Models" as additional answer data to be added when the answer type information indicates "B".

Furthermore, the answer data acquisition unit 215 performs processing based on the addition rule, and adds a link target address of a web page of applicable model information to the character string "Applicable Models" in the additional answer data. The process of adding link target information to the additional answer data the answer data acquisition unit 215 is described in further detail below.

More specifically, for example, the answer data acquisition unit 215 transmits the FAQ number acquired by the FAQ number acquisition unit 213 to the link generation unit 219, and instructs the link generation unit 219 to generate a web page of the applicable model information. The answer data acquisition unit 215 further instructs the link generation unit 219 to transmit the address of the web page of the applicable model information to the answer data acquisition unit 215. Thus, the answer data acquisition unit 215 acquires answer result data obtained by embedding the web page address of the applicable model information received from the link generation unit 219 in the additional answer data. More specifically, as shown in FIG. 3C, the answer data acquisition unit 215 adds the address of the web page of the applicable model information, as the link target, to the character string "Applicable Models" in the additional answer data. As a result, the answer result data in which the link target information is embedded in the "Application Models" as shown in FIG. 7A is transmitted from the server apparatus 2 to the user terminal 4 and is displayed on the user terminal 4. Furthermore, when "Applicable Models" is selected on the user terminal 4, the web page of the applicable model information generated by the link generation unit 219 such as that shown in FIG. 7B is transmitted from the server apparatus 2 to the user terminal 4 and is displayed on the user terminal 4.

For example, an a case where the answer type information indicates "C", the answer data acquisition unit performs processing based on an addition rule shown in FIG. 3C thereby acquiring additional answer data, instead of the chat answer data, as answer result data. Moe specifically, for example, as shown in FIG. 3C, the answer data acquisition unit 215 acquires character strings "The answer depends on the model" and "See here" as additional answer data for the case where the answer type information indicates "C".

Furthermore, the answer data acquisition unit 215 performs processing based on the addition rule, and embeds an address of a web page for selecting the model as a link target in the character string "here". The answer data acquisition unit 215 sends the FAQ number to the link generation unit 219 in the same manner as with the above-described model information web page, and issues an instruction in terms of the model selection web page. The answer data acquisition unit 215 receives the address of the web page for model selection generated by the link generation unit 219 from the link generation unit 219. Then, the answer data acquisition unit 215 acquires answer result data obtained by embedding the received address of the model selection web page in the additional answer data. More specifically, the answer data acquisition unit 215 adds the address of the web page for selecting the model to the link target of the character string "here" of the additional answer data, as indicated by the addition rule and link target information in FIG. 3C. As a result, the answer result data in which the link target is embedded in "here" as shown in FIG. 9A is transmitted from the server apparatus 2 to the user terminal 4 and displayed on the user terminal 4. When "here" is selected on the user terminal 4, the model selection web page such as that shown in FIG. 9B is transmitted from the server apparatus 2 to the user terminal 4 and displayed on the user terminal 4.

Furthermore, the answer data acquisition unit 215 may additionally acquire, as answer data, moving image data, product information, and data linked to a support page stored in toe support data storage unit 203.

For example, the link generation unit 219 generates a web page based on the FAQ number in response to an instruction from the answer data acquisition unit 215, and sends the address of the generated web page to the answer data acquisition unit 215.

More specifically, the link generation unit 219 generates the web page for the applicable model information based on the FAQ number received from the answer data acquisition unit 215 and the instruction to generate the web page of the applicable model information. Then, the link generation unit 219 sends the web page address of the applicable model information to the answer data acquisition unit 215. For example, when the link generation unit 219 receives "113" as the FAQ number from the answer data acquisition unit 215 and receives an instruction to generate a web page of the applicable model information, the link generation unit 219 acquires model name information "AAA", "BBB", "EEE", and "LLL" associated with the FAQ number "113" from the FAQ data storage unit 202. The link generation unit 219 then generates a web page of applicable model information so as to indicate character strings "AAA", "BBB", "EEE", and "LLL", representing model names described in the acquired model name information. Furthermore, the link generation unit 219 sends the address of the generated web page of the applicable model information to the answer data acquisition unit 215.

More specifically, the link generation unit 219 generates a model selection web page based on the model name information received from the answer data acquisition unit 215 and an instruction to generate a model selection web page. Then, the link generation unit 219 sends the address of the model selection web page to the answer data acquisition unit 215. More specifically, for example, the link generation unit 219 receives the FAQ numbers "110", "111", and "112" from the answer data acquisition unit 215, and model name information corresponding to each of the FAQ numbers "110", "111", and "112". The link generation unit 219 then generates a model selection web page in which groups of model names for respective piece of model name information corresponding to FAQ numbers are described such that descriptions are separated by a certain distance between the model name groups. More specifically, as shown in FIG. 9B, the link generation unit 219 places model names "AAA", "BBB", "CCC", "DDD", and "EEE" corresponding to the FAQ number "110" in an upper area of the screen, and places, below this area, model names "MMM", "PPP", and "RRR" corresponding to the FAQ number "111". The link generation unit 219 performs processing in a similar manner for the FAQ number "112". As a result, a model selection web page is obtained in which model name groups corresponding to the respective FAQ numbers are described such that they are apart from each other by a certain distance as shown in FIG. 9B. Note that when link generation unit 219 generates the web page for model selection, the link generation unit 219 may make descriptions such that spaces are provided between model name groups as shown in FIG. 9B, or such that the descriptions are made in different colors depending on the model name groups.

Furthermore, the link generation unit 219 acquires addresses of the link targets linked to pages on which respective pieces of answer data corresponding to original answer data "A1", "A2", and "A3" corresponding to the FAQ numbers are displayed, and the link generation unit 219 embeds the link targets in the model names of the model selection web pages. Note that the original answer data may be data of a web page of existing original answer data stored in the support data storage unit 203 and provided to the user terminal 4, or a new web page for the original answer may be generated such that the character string of the original answer data is displayed at a proper position in the web page.

The return answer data generation unit 216 generates return answer data in which the chat question data retrieved by the question information search unit 212 and the answer result data are combined together. Note that the return answer data may be character string data including the chat question data and the answer result data, or may be any of data describing them in the HTML format as long as it can be displayed on the user terminal 4.

The return answer data generation unit 216 may generate return answer data by combining, therein, question information acquired by the question information acquisition unit 211, chat question data retrieved by the question information search unit 212, and an answer result data including a link target acquired by the answer data acquisition unit 215.

The return answer data output unit 217 transmits the return answer data generated by the return answer data generation unit 216 to the user terminal 4 via the first server apparatus communication unit 220. The return answer data output unit 217 may transmit not only the return answer data but also other various kinds of data to the user terminal 4 via the first server apparatus communication unit 220.

Operation Flow

Figure 4:
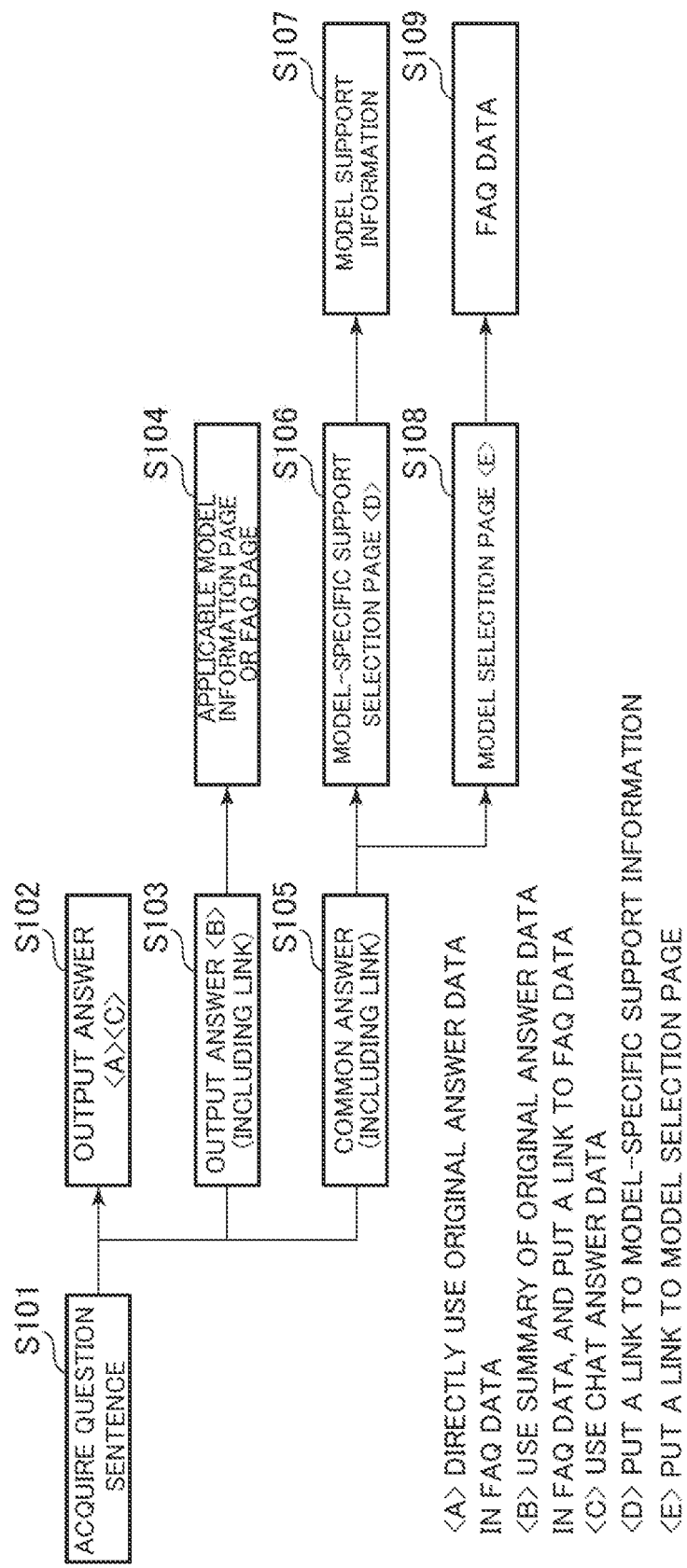
FIG. 4 is a diagram showing an example of an operation flow performed by the support system shown in FIG. 1.

FIG. 4 is a diagram illustrating an example of a display content displayed on the user terminal 4 in the support system 1. FIGS. 5 to 9 illustrate examples of chat-based support page screens displayed on the user terminal 4.

In the support system 1, when the support system 1 is accessed by the user terminal 4, the question information acquisition unit 211 of the server apparatus 2 acquires a question sentence input via the user terminal 4 (S101).

The question information search unit 212 searches the chat data storage unit 201 for chat question data identical or similar to the received question sentence.

Then, the return answer data generation unit 216 generates return answer data in which the retrieved chat question data and the answer result data acquired by the answer data acquisition unit 215 are combined. The return answer data output unit 217 outputs the return answer data to the user terminal 4. The return answer data is displayed on the user terminal 4 (S102, S103, S105).

The answer result data displayed on the user terminal 4 can be classified into several types, each of which will be described in detail below.

Figure 5:
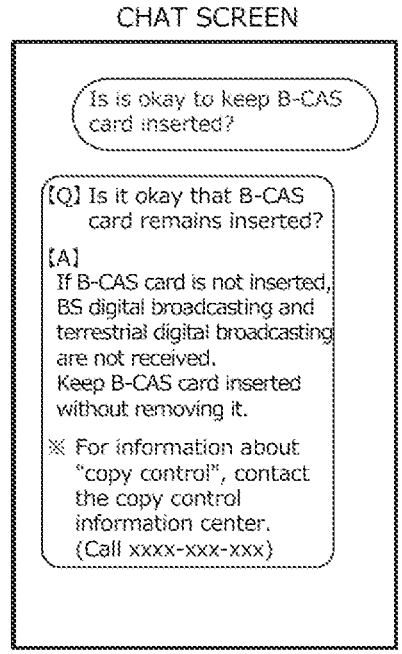
FIG. 5 is a diagram illustrating a specific example of a web page according to an embodiment of the present disclosure.

A first type of answer result data generated by the return answer data generation unit 216 is data generated, as shown in FIG. 5, such that when a question sentence is input via the user terminal 4, chat question data identical or similar to the question sentence is combined together with answer result data corresponding to the chat question data thereby generating return answer data. The resultant return answer data is transmitted to the user terminal 4 and is displayed on the user terminal (S102).

More specifically, for example, as shown in FIG. 5, the return answer data generation unit 216 generates return answer data in which the chat question data stored in the chat data storage unit 201 is placed at a location following "Q", and answer result data is placed at a location following "A". The resultant return answer data is displayed on the user terminal 4. As a result, the retrieved chat question data identical or similar to the question sentence is displayed on the user terminal, and thus a user can grasp at a glance which chat question data corresponds to the input question sentence. The start position of the chat question data and the start position of the answer result data are respectively indicated by "Q" and "A" such that these pieces of data can be distinguished. Thus, the user can easily understand where the content of the answer result data starts.

A second type of answer result data generated by the return answer data generation unit 216 is data generated, as shown in FIGS. 6A and 7A, such that when a question sentence is input via the user terminal 4, retrieved question data identical or similar to the question sentence is combined together with answer result data including added link target information thereby generating return answer data. The resultant return answer data is transmitted to the user terminal 4 and is displayed on the user terminal (S103, S105).

Figure 6:
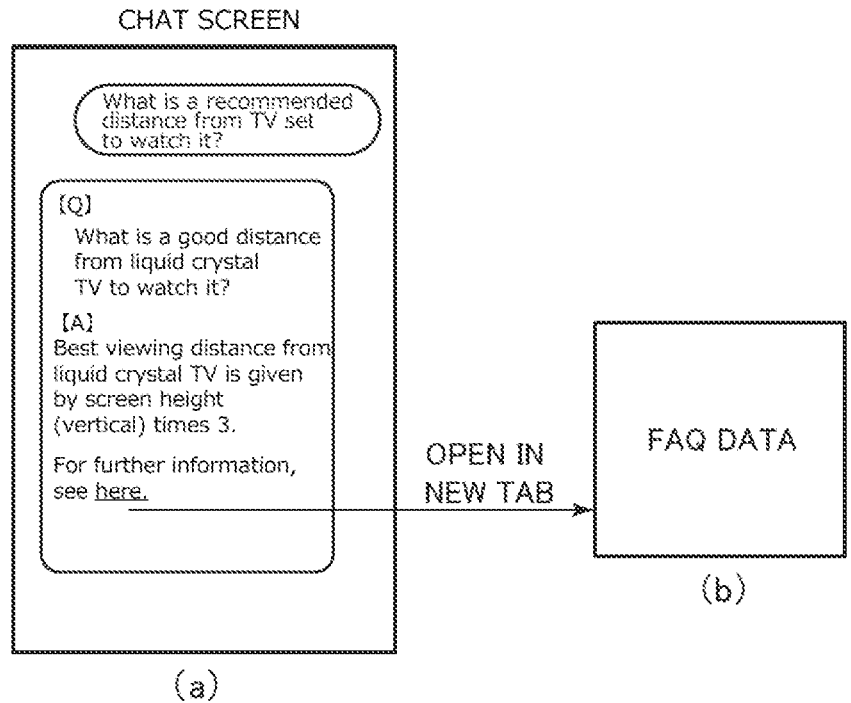
FIG. 6 is a diagram illustrating a specific example of a web page according to an embodiment of the present disclosure.

The second type of answer result data is described further below for a case where return answer data such as that shown in FIG. 6 is generated. The return answer data generation unit 216 generates summary data representing a summary of retrieved chat question data identical or similar to a question sentence acquired by the answer data acquisition unit 215 and a summary of original answer data corresponding to the chat question data.

Thereafter, the return answer data generation unit 216 combines the chat question data retrieved by the question information search unit 212 and the chat answer data in which the link target to a web page of the original answer data is embedded in the summary data thereby generating return answer data.

Note that the summary data may be stored in the chat answer data in the chat data storage unit 201, or the return answer data generation unit 216 or the answer data acquisition unit 215 may extract, from the original answer data, a particular part starting from the beginning of the original answer data to a particular character and may employ the extracted data as summary data thereby acquiring answer result data.

More specifically, for example, as shown in FIG. 6A, the question sentence input via the user terminal 4 is displayed in an upper area of the screen of the user terminal 4, and the return answer data obtained by combining the retrieved chat question data and the summary data is displayed below the question sentence (S103).

Thus, the summary of answer data is first displayed as the answer to the question sentence. Thus the user can immediately know the summary of the answer the user wants to know.

If the link in the return answer data displayed in S103 on the user terminal 4 is selected on the user terminal 4, the selected input information is transmitted to the server apparatus 2. Based on the input information, the web page of the original answer data at the link target is transmitted to the user terminal 4 by the return answer data output unit 217. More specifically, as shown in FIG. 6B, when "here" where the link target information is embedded in the return answer data is selected, the web page of the original answer data is displayed (S104).

Detailed answer data is displayed simply by selecting the link target without performing a complicated operation including scrolling the answer data. Thus, the user can get the answer data by performing a simple operation.

The second type of answer result data is described further below with reference to another example in which return answer data such as that shown in FIG. 7 is generated. The answer data acquisition unit 215 acquires additional answer data corresponding to the answer type information in the chat data storage unit 201. Thereafter, the answer data acquisition unit 215 instructs the link generation unit 219 to generate a web page of applicable model information. Data is then generated such that the web page address of the applicable model information received from the link generation unit 219 is embedded in each character string or the like in the additional answer data. The resultant data is employed as answer result data.

Thereafter, the return answer data generation unit 216 generates return answer data by combining the chat question data retrieved by the question information search unit 212, the additional answer data, and the chat answer data corresponding to the chat question data.

More specifically, for example, as shown in FIG. 7A, the question sentence input via the user terminal 4 is displayed in an upper area of the screen of the user terminal 4, and return answer data obtained by combining the retrieved chat question data, the additional answer data included added link target information, and the chat answer data is displayed below the question sentence (S103).

Thus, short chat answer data is first displayed as the answer to the question sentence. Thus the user can immediately know the summary of the answer the user wants to know.

If the link in the return answer data displayed in S103 is selected on the user terminal 4, the selected input information is transmitted to the server apparatus 2. Based on the input information, the return answer data output unit 217 transmits a web page of applicable model information generated by the link generation unit 219 to the user terminal 4. More specifically, as shown in FIG. 7B, when "Applicable Models" where the link target information is embedded in the return answer data is selected, a web page of the applicable model information is displayed (S104).

Thus, the user can get the answer data by performing a simple operation including inputting a question sentence describing what the user wants to know without inputting a model name.

A third type of answer result data generated by the return answer data generation unit 216 is data generated, as shown in FIGS. 8A and 9A, such that answer result data including additional answer data, to the question sentence, in which a link is added is generated. As the third type of answer result data, as shown in FIGS. 8B and 9B, an answer page for each model corresponding to the link in the additional answer data is generated.

The third type of answer result data is described further below for a case where return answer data such as that shown in FIG. 8 is generated. The answer data acquisition unit 215 acquires additional answer data corresponding to the answer type information in the chat data storage unit 201. Thereafter, the answer data acquisition unit 215 instructs the link generation unit 219 to generate a web page for model selection. Data is then generated such that the web page address received from the link generation unit 219 is embedded in a character string or the like in the additional answer data, and the resultant data is employed as answer result data.

Note that the link generation unit 219 may acquire a model-specific support selection web page stored in the support data storage unit 203 without generating the model-specific support selection web page. On the model-specific support selection web page stored in the support data storage unit 203, link target information pointing to model support information corresponding to each model name is added to the model name on the web page. Furthermore, model support information for each model name is stored in the support data storage unit 203.

Thereafter, the return answer data generation unit 216 generates return answer data by combining the chat question data retrieved by the question information search unit 212, the additional answer data including link information pointing to the model-specific support selection web page, and the chat answer data corresponding to the chat question data.

More specifically, for example, as shown in the chat screen of FIG. 8A, the question sentence input via the user terminal 4 is displayed in an upper area of the screen of the user terminal 4, and the return answer data obtained by integrating the retrieved chat question data, the additional answer data to which the link target pointing to the model-specific selection web page is added, and the chat answer data is displayed below the question sentence (S105).

Thus, short chat answer data is first displayed as the answer to the question sentence. Thus the user can immediately know the summary of the answer the user wants to know.

When the link in the return answer data displayed in S105 is selected on the user terminal 4, the selected input information is transmitted to the server apparatus 2. Based on the input information, the return answer data output unit 217 transmits the model-specific support selection web page generated by the link generation unit 219 to the user terminal 4.

More specifically, as shown in FIG. 8A, when the "model-specific support page", in which the link target information is embedded, in the return answer data is selected, the model-specific support selection web page is displayed as shown in FIG. 8B (S106). In the present example, as shown in FIG. 8 (b), the model-specific support selection web page is configured such that the series name is displayed on the left side and the model name of each series is displayed on the right side. However, the format is not limited to this example.

Thus, a list of models related to the question issued by a user is displayed, which makes it unnecessary for the user to input a model name as a question sentence. Thus, it becomes possible to get the answer to the question by performing a simpler operation.

Since an address of a web page for providing support information for each model is embedded in a model name described in the model-specific support web page, when a model name is selected on the user terminal 4, the selected input information is transmitted to the server apparatus 2, and, based on the input information, the return answer data output unit 217 transmits a web page of model support information related to the selected model name to the user terminal 4. More specifically, when a model name is selected on a web page for selecting model-specific support information in FIG. 8B, a web page, where model-specific support information is provided, linked from the selected model name is displayed as shown in FIG. 8C (S107).

Thus, after inputting the question sentence, the user can know the answer by performing a simpler operation without inputting the model name. Thus, the user can get answers by performing simpler operations.

As another example of the third answer result data is described below for a case where return answer data such as that shown in FIG. 9 is generated. The answer data acquisition unit 215 acquires additional answer data corresponding to the answer type information in the chat data storage unit 201. Then, the answer data acquisition unit 215 instructs the link generation unit 219 to generate a web page for model selection, and adds an address of the web page received from the link generation unit 219 to a particular character string or the like in the additional answer data and employing the resultant data as answer result data.

Then, the return answer data generation unit 216 generates return answer data in which the chat question data retrieved by the question information search unit 212, additional answer data including link information pointing to the model selection web page, and chat answer data corresponding to chat question data are integrated.

More specifically, for example, as shown in a chat screen of FIG. 9A, the question sentence input via the user terminal 4 is displayed in an upper area of the screen of the user terminal 4. The return answer data obtained by integrating the retrieved chat question data, the additional answer data to which the link target pointing to the model selection web page is added, and the chat answer data is displayed below the question sentence (S105).

If the link in the return answer data displayed in S105 is selected on the user terminal 4, the selected input information is transmitted to the server apparatus 2. Based on the input information, the return answer data output unit 217 transmits the model selection web page generated by the link generation unit 219 to the user terminal 4.

More specifically, as shown in FIG. 9A, when "here", in which the link target information is embedded, is selected in the return answer data is selected, the model selection web page is displayed as shown in FIG. 9B (S108). As shown in FIG. 9B, the model selection web page is displayed such that model name groups corresponding respective FAQ numbers are displayed at locations separated apart by a certain distance from each other. However, the manner of displaying the model selection web page is not limited to this example. For example, the respective model name groups may be displayed in different colors.

That is, on the model selection web page, a model name group for which the answer with the same content is provided is located, on the web page, apart by a particular distance from other model name groups for which the answers with different contents are provided, and thus a user can grasp at a glance which model has the same answer.

Since the link target information pointing to the web page of the original answer data corresponding to the chat question data is embedded in the model name in the model selection web page, when the model name is selected on the user terminal 4, the selected input information is transmitted to the server apparatus 2, and, based on the input information, the return answer data output unit 217 transmits the web page for the original answer data corresponding to the selected model name to the user terminal 4. More specifically, as shown in FIG. 9 (c), when the model name in the model selection web page is selected, the web page of the original answer data linked to the selected model name is displayed (S109).

Thus, the user can know the answer to the question issue by the user by simply selecting the link target without making an inquiry to a call center.

FIG. 10 illustrates an example of a chat-based support page screen displayed on the user terminal 4. More specifically, FIG. 10 shows an example of a chat screen on which in addition to chat question data with a highest score among a plurality of pieces of chat question data identical or similar to the question sentence input at the user terminal 4, a plurality of pieces of other chat question data with high scores are displayed.

First, when the user terminal 4 accesses the support system 1 for the first time, the server apparatus control unit 210, for example, transmits an initial message stored in the server apparatus storage unit 200 via the first server apparatus communication unit 220. The user terminal 4 displays the received initial message in an upper area of the chat screen. Furthermore, the question sentence input in an "Input Question" area displayed at the bottom of the chat screen of the user terminal 4 is displayed below the initial message on the chat screen. Then, the question information search unit 212 searches the chat question data in the chat data storage unit 201 for chat question data having the highest score identical or similar to the input question sentence. Then, the return answer data generation unit 216 generates return answer data by combining the chat question data having the highest score and the answer result data corresponding to the chat question. Furthermore, the return answer data output unit 217 transmits the return answer data generated by the return answer data generation unit 216 to the user terminal 4 via the first server apparatus communication unit 220.

Further, the question information search unit 212 searches the chat question data in the chat data storage unit 201 for a plurality of chat question data having a high score that matches or is similar to the question sentence. Thereafter, the return answer data generation unit 216 generates candidate data by combining a plurality of pieces of chat question data retrieved by the question information search unit 212. Note that the return answer data generation unit 216 may generate return answer data such that link information, pointing to a location for generating return answer data in which each piece of chat question data and answer result data corresponding to each chat question data are integrated, is included in each chat question data of candidate data. Then, the return answer data output unit 217 transmits the candidate data generated by the return answer data generation unit 216 to the user terminal 4 via the first server apparatus communication unit 220. The user terminal 4 displays the received return answer data and candidate data below the return answer data on the chat screen. Here, for example, as shown in FIG. 10, candidate data generated by the return answer data generation unit 216 may be such data in which a message "See also the following:" and the candidate data are integrated such that the candidate data is displayed following the message "See also the following:".

In a case where each chat question data in the candidate data displayed on the user terminal 4 includes link information for executing generation of return answer data as shown in FIG. 10, if link information pointing to chat question data is selected, the return answer data generation unit 216 generates return answer data in which the selected chat question data and corresponding answer result data are combined. Thereafter, the return answer data output unit 217 transmits the return answer data to the user terminal 4 via the first server apparatus communication unit 220, and this return answer data is displayed on the user terminal 4.

When chat question data in the displayed return answer data is different from the question the user wants to ask, or when the answer result data in the return answer data is not consistent with an answer the user wants to get, if the user selects another chat question data in the candidate data, then the user can easily refer to answer result data corresponding to the selected new chat question data, thereby getting the answer to the question the user issued.

As described above, in the support system 1 according to an embodiment of the present disclosure, one type of answer data is displayed for a question sentence input on the user terminal 4. In other words, the server apparatus 2 is configured such that chat answer data corresponding to chat question data identical or similar to a question sentence is transmitted to the user terminal 4, and no further answer is provided. Next, a modified example of the support system 1 is described below. In this modified example, answer data displayed on the user terminal 4 includes selectable options. When the user selects one of the options, new answer data is transmitted from the server apparatus 2 to the user terminal 4. Thus, it is allowed to interactively narrow down answers.

FIG. 11 is a diagram showing an example of a data structure of chat data used in the support system 1 according to a modification of the embodiment of the present disclosure. FIG. 12 is a diagram showing examples of some pieces of information indicating contents of processing performed in the server apparatus 2 in the support system 1 according to a modification of the embodiment of the present disclosure.

More specifically, as shown in FIG. 11, the chat data storage unit 201 further includes a management ID in addition to the chat data shown in FIG. 3B, and further includes "G", "H", and "I" as answer type information.

The management ID is a number for managing the chat question data and the corresponding chat answer data. The management ID indicates a link target (link information) from a character string included in chat answer data to another chat question data and another chat answer data.

As shown in FIG. 12, the answer type information "G", "H", and "I" respectively have their information indicating addition rules, additional data, and link information, which indicate contents of processing performed in the server apparatus 2. More specifically, based on adds the addition rule, additional data, and link target information shown in FIG. 12 and the management ID added to a character string in chat answer data, the answer data acquisition unit 215 of the server apparatus 2 acquires chat answer data in which link information pointing to the chat data corresponding toe management ID is added to the character string.

Note that the character string to which the management ID is added is, for example, is the answer content to the question content included in the chat answer data. In a case where chat answer data includes a plurality of answer contents, a management ID is added to the character string of each answer content. The question content and the answer content may be requesting the user to input additional information and a list of a plurality of pieces of additional information.

When the chat answer data with the added link information is transmitted from the server apparatus 2 to the user terminal 4, the user terminal 4 displays the answer content corresponding to the link information or the contents of additional information as selectable options.

Furthermore, when one of the options included in the chat answer data is selected on the user terminal 4, the link information added to the selected option is transmitted from the user terminal 4 to the server apparatus 2. The answer data acquisition unit 215 of the server apparatus 2 acquires chat question data (third question data) and chat answer data (third answer data), which are chat data identified by the management ID indicated by the received link information. Then, the server apparatus 2 transmits the acquired chat question data (third question data) and chat answer data (third answer data) to the user terminal 4. The user terminal 4 receives and displays them.

That is, the user terminal 4 displays chat answer data to the input question sentence, and when one of answer contents is selected from a plurality of answer contents to the question contents included in the chat answer data, the chat question data and the chat answer data corresponding to the answer content are displayed.

Thus, when the user wants to know the answer to his/her question, the user first inputs the question on the user terminal 4 and selects one of the options from a plurality of options included in the displayed contents of the answer to the question. Thus, the answer the user wants to know is displayed. Thus, the user can get the answer with simpler operations.

If the chat answer data acquired by the answer data acquisition unit 215 does not have link information, the server apparatus 2 transmits questionnaire screen data to the user terminal 4, and the user terminal 4 displays the questionnaire screen. The questionnaire screen is a screen for asking a user whether answer data presented to the user is useful or not. A questionnaire screen 1307 shown in FIG. 13 is a specific example of a questionnaire screen. When a "questionnaire" button included in the last answer data presented to the user is selected, the user terminal 4 displays the questionnaire screen. The user terminal 4 may display the questionnaire screen together with the last answer data. On the questionnaire screen, evaluation buttons "A", "B", "C", and "D" indicating evaluation levels are displayed. The evaluation buttons are used to indicate following meanings: "A" means "very useful", "B" means "helpful", "C" means "normal", and "D" means "useless". Then, for example, when "A" is selected on the questionnaire screen, the server apparatus 2 adjusts the score when searching is performed for chat question data identical or similar to a question sentence such that the score indicating the degree of similarity of the chat question data with respect to the question sentence is increased such that the probability for the chat data to be retrieved is increased. That is, the server apparatus 2 adjusts the score depending on the selected evaluation button, and performs processing so as to search for more appropriate chat question data for the input question sentence.

Accordingly, answer data that is more likely to be useful is presented based on the questionnaire result. Thus, the user can get an appropriate answer quickly.

FIG. 13 is a diagram showing a specific example of a web page according to a modification of the support system 1. The operation of the modification of the support system 1 is described below with reference to an example of a chat-based screen displayed on the user terminal 4 in FIG. 13.

When a question sentence "Power does not turn on" is input on the user terminal 4, a character string "Power does not turn on" is displayed on a screen 1301. Then, the question information search unit 212 searches for "power does not turn on" as chat question data identical or similar to the question sentence.

Then, as shown in FIG. 11, the answer type acquisition unit 214 acquires "G" as answer type information corresponding to the chat question data "The power does not turn on" retrieved by the question information search unit 212.

Then, as shown in FIG. 12, based on the addition rule "Do not display the questionnaire screen" corresponding to the answer type information "G", the answer data acquisition unit 215 does not acquire the data of the questionnaire screen, and the server apparatus 2 does not transmit the questionnaire screen data to the user terminal 4.

Furthermore, as with the addition rule corresponding to the answer type information "A" in FIG. 3C, the answer data acquisition unit 215 acquires, as answer result data from the chat data storage unit 201, chat answer data corresponding to the chat question data retrieved by the question information search unit 212. More specifically, the answer data acquisition unit 215 acquires chat answer data corresponding to "The power does not turn on" in the chat question data retrieved based on the input question sentence. Then, the answer data acquisition unit 215 acquires character strings "Check the status of the power lamp" and "—The lamp is off", and "—The lamp is blinking" in the chat answer data. Thereafter, based on the processing content of the additional answer data "add link to management ID" corresponding to the answer type information "G", the answer data acquisition unit 215 adds link information indicated by the chat data management ID "201" to the character string "The lamp is off" before "<201>" included in the chat answer data. Similarly, the answer data acquisition unit 215 adds link information indicated by the management ID "202" of the chat data to the character string "The lamp is blinking". Here, "< >" included in the chat answer data indicates link information pointing to the management ID of chat data identical to the number described between "<" and ">".

Then, the return answer data generation unit 216 generates a character string "Power does not turn on" as chat question data, and further generates return answer data in which character strings "Check the status of the power lamp", "—The lamp is off", and "—The lamp is blinking" and two pieces of link information added respectively to the "—The lamp is off" and "—The lamp is blinking" are integrated. The server apparatus 2 then transmits the return answer data to the user terminal 4. The user terminal 4 displays the screen 1302 shown in FIG. 13 based on the received return answer data. In this displaying process performed by the user terminal 4, the character string to which the link information is added is displayed such that it is selectable.

When "The lamp is off" is selected on the user terminal 4, information indicating that "The lamp is off" is selected is transmitted from the user terminal 4 to the server apparatus 2. In response, the answer type acquisition unit 214 of the server apparatus 2 acquires answer type information "H" of the chat data corresponding to the management ID "201" that is the link information added to "The lamp is off".

In this case, as shown in FIG. 12, based on the addition rule "Do not display questionnaire screen" corresponding to the answer type information "H", the answer data acquisition unit 215 does not acquire the questionnaire screen data, and the server apparatus 2 does not transmit the questionnaire screen data to the user terminal 4.

Furthermore, based on the addition rule corresponding to the answer type information "H", that is, "the chat question data is not displayed together with the chat answer data", the return answer data generation unit 216 generates data such that the chat question data and the chat answer data are different piece of return answer data. The server apparatus 2 transmits each piece of return answer data to the user terminal 4.

More specifically, the answer data acquisition unit 215 acquires a character string "the power lamp is off" as chat question data corresponding to the management ID "201". Then, the return answer data generation unit 216 generates return answer data including only a character string "the power lamp is off" of the chat question data. The server apparatus 2 first transmits the return answer data to the user terminal 4. The user terminal 4 displays a screen 1303 shown in FIG. 13 based on the received return answer data.

Next, the answer data acquisition unit 215 acquires character strings, as chat answer data corresponding to the management ID "201", "The power is probably not supplied to the equipment. * Is the situation improved?", "—The situation is improved", and "—The situation is not improved". Furthermore, based on the content of processing, "Add link to management ID", described in the additional answer data corresponding to the answer type information "H", the answer data acquisition unit 215 link information pointing to the management ID "203" is added to the character string "The situation is improved" included in the chat answer data. Similarly, the answer data acquisition unit 215 adds link information pointing to the management ID "204" to the character string "The situation is not improved". Thereafter, the return answer data generation unit 216 generates return answer data in which the character string of the chat answer data corresponding to the selected management ID "201" and the link information pointing to the management ID are combined. Thereafter, the server apparatus 2 transmits the return answer data to the user terminal 4, and the user terminal 4 displays a screen 1304 shown in FIG. 13** based on the received return answer data.

In a case where "The lamp is blinking" is selected in the screen 1302 of the user terminal 4, the return answer data generation unit 216 of the server apparatus 2 similarly generates, as return answer data, a character string of chat question data corresponding to the management ID "202" based on the answer type information "H" corresponding to the management ID "202" pointed to by the link information added to "The lamp is blinking". The server apparatus 2 transmits the return answer data to the user terminal 4. The user terminal 4 displays a screen based on the received return answer data. Furthermore, the return answer data generation unit 216 generates return answer data by adding link information corresponding to the management ID included in the chat answer data to the character string of the chat answer data corresponding to the management ID "202". The server apparatus 2 transmits the return answer data to the user terminal 4. The user terminal 4 displays a screen based on the received return answer data.

In this situation, on the screen 1302, the user terminal 4 displays chat question data on the same screen on which the chat answer data is displayed such that it is allowed to easily to grasp the chat question data retrieved for the input question sentence. Note that the user terminal 4 displays the chat question data and the chat answer data separately on the screens 1303 and 1304. The chat question data displayed on the screen 1303 is uniquely determined by the link information associated with an option selected by the user on the screen 1302. That is, the user may not confirm whether the displayed chat question data is valid unlike the case with the screen 1302, and thus the user terminal 4 displays only the chat question data on the screen 1303 and displays only the chat answer data on the screen 1304. That is, only the content the user wants to get is displayed on the chat answer data screen, and thus the user can grasp the answer content efficiently.

Note that the return answer data generation unit 216 of the server apparatus 2 may transmit chat question data, chat answer data, and the answer type information "H" corresponding to the management ID "201" all together at a time to the user terminal 4. Based on the processing content corresponding to the received answer type information "H", the user terminal 4 may display the chat question data with the management ID "201" on the screen 1303 shown in FIG. 13 and may further display chat answer data corresponding to the management ID "201" in the screen 1304 shown in FIG. 13. Details of the configuration in which chat data is collectively transmitted from the server device 2 to the user terminal 4 is described later.

A further description is given below on processing performed by the user terminal 4 after the screen 1304 shown in FIG. 13 is displayed.

In a case where "The situation is improved" is selected on the screen 1304 of the user terminal 4, information indicating that "The situation is improved" is selected is transmitted from the user terminal 4 to the server apparatus 2. Then, the answer type acquisition unit 214 acquires answer type information "I" for the chat data corresponding to the management ID "203" that is the link information added to "The situation is improved".

Based on the addition rule corresponding to the answer type information "I", that is, based on the rule "Do not display chat question data together with the chat answer data", the return answer data generation unit 216 generates chat question data and chat answer data as different return answer data. The server apparatus 2 then transmits the respective pieces of return answer data to the user terminal 4.

More specifically, in the case where "The situation is improved" is selected on the screen 1304, the answer data acquisition unit 215 acquires the character string "The situation is improved", which is chat question data corresponding to the management ID "203". The return answer data generation unit 216 then generates return answer data so as to include only the character string "The situation is improved" as chat question data. The server apparatus 2 first transmits the return answer data to the user terminal 4 The user terminal 4 displays a screen 1305 shown in FIG. 13 based on the received return answer data.

Next, the answer data acquisition unit 215 acquires a character string "If the situation has been improved, . . . Apply for repair", which is chat answer data corresponding to the management ID "203". Then, the answer data acquisition unit 215 acquires a character string "questionnaire"

and link information pointing to a questionnaire screen based on the addition rule corresponding to the answer type information "I", that is, the addition rule indicating "Display a questionnaire screen". The return answer data generation unit 216 combines together a character string of chat answer data corresponding to the selected management ID "203", a character string "questionnaire", and link information added to the character string of "questionnaire" and pointing to a questionnaire screen thereby generating unified return answer data. The server apparatus 2 transmits the generated return answer data to the user terminal 4. Furthermore, the server apparatus 2 transmits questionnaire screen data to the user terminal 4. The user terminal 4 displays a screen 1306 as shown in FIG. 13 based on the received return answer data.

In this process, the return answer data generation unit 216 of the server apparatus 2 may collectively transmit the chat question data, the chat answer data, and the answer type information "I" corresponding to the management ID "203" to the user terminal 4. Then, the user terminal 4 may display the chat question data corresponding to the management ID "203" in the screen 1305 shown in FIG. 13 based on the processing content corresponding to the received answer type information "I", and the user terminal 4 may further display chat answer data corresponding to the management ID "203" in the screen 1306 shown in FIG. 13. Details of the configuration in which chat data is collectively transmitted from the server apparatus 2 to the user terminal 4 will be described later.

In a case where "questionnaire" is selected on the user terminal 4, the user terminal 4 displays a questionnaire screen 1307 received from the server apparatus 2.

In a case where "The situation is not improved" is selected in the screen 1304, the return answer data generation unit 216 of the server apparatus 2 generates a character string of chat question data corresponding to the management ID "204" as return answer data in a similar manner as in the previous process and based on the answer type information "I" corresponding to the management ID "204" pointed to by the link information added to the character string "The situation is not improved". The server apparatus 2 transmits the return answer data to the user terminal 4. The user terminal 4 displays a screen based on the received return answer data. Then, the answer data acquisition unit 215 acquires a character string "questionnaire" and link information pointing to a questionnaire screen based on an addition rule, "Display a questionnaire screen", corresponding to the answer type information "I". Then, the return answer data generation unit 216 generates return answer data such that it include chat answer data corresponds to the selected management ID "204", and a character string "questionnaire", and link information pointing to a questionnaire screen is added to the character string "questionnaire" and they are integrated. The server apparatus 2 transmits the generated return answer data to the user terminal 4. Furthermore, the server apparatus 2 transmits questionnaire screen data to the user terminal 4. The user terminal 4 displays a screen based on the received return answer data. If "questionnaire" is selected on the user terminal 4, the user terminal 4 displays a questionnaire screen 1307 received from the server apparatus 2.

Next, the addition rule "Do not search for input character string" included in the addition rules corresponding to the answer type information "H" and "I" shown in FIG. 12 is described below.

The chat data corresponding to the answer type information "H" and "I" is chat data displayed in the middle of the scenario following the chat answer data of the answer type "G", and this addition rule means that the chat question data corresponding to the answer type information "H" and "I" is not searched for when searching is performed for chat question data identical or similar to the question sentence input via the user terminal 4. That is, when the question information search unit 212 of the server apparatus 2 searches for chat question data identical or similar to the question sentence input via the user terminal 4, searching is not performed for chat question data corresponding to the answer type information "H" and "I".

This makes it possible to avoid a situation in which data occurring in the middle of the chat data scenario is displayed first as an answer to the question sentence, and thus only an appropriate answer to the question sentence issued by the user is displayed.

In the above-described example, the server apparatus 2 transmits chat data to the user terminal 4 at each timing of displaying the chat data on the user terminal 4. However the present disclosure is not limited to this.

Next, a manner of collectively transmitting chat data from the server device 2 to the user terminal 4 is described.

The server apparatus 2 for example, at the time when the chat data retrieved based on the question sentence input via the user terminal 4 is transmitted to the user terminal 4, the retrieved chat data and the data corresponding to the link information included in the retrieved chat data are all transmitted at a time to the user terminal 4. Specifically, the server apparatus 2 transmits data to the user terminal 4 such that all other pieces of chat data related to the chat data to be transmitted and the answer type information corresponding to each piece of chat data are transmitted at a time to the user terminal 4. More specifically, the server apparatus 2 transmits, collectively at a time, chat data to be transmitted and various kinds of data such as data of the applicable model information page or the model-specific support information page in S104 and S106 to S109 in FIG. 4.

Then, the user terminal 4 displays the chat data and the link information data on the display unit based on the received chat data and the data corresponding to the link information included in the received chat data. Furthermore, the user terminal 4 stores the processing content corresponding to the answer type information shown in FIG. 3C or FIG. 12 in the storage unit of the user terminal 4, and the user terminal 4 displays the chat data on the display unit based on all the received chat data, the answer type information, and the processing content corresponding to the answer type information. Furthermore, the user terminal 4 stores the data of the standard questionnaire screen in the storage unit of the user terminal 4, When the chat data corresponding to the answer type information "I" is displayed, the user terminal 4 acquires data of the questionnaire screen from the storage unit, and displays the acquired questionnaire screen on the display unit.

More specifically, the answer data acquisition unit 215 of the server apparatus 2 acquires chat data corresponding to the management ID "200", which is an answer to the question sentence in put in the screen 1301, and the answer data acquisition unit 215 further acquires answer type information "G". Then, the answer data acquisition unit 215 acquires management IDs "201" and "202" of link information included in the chat answer data corresponding to the management ID "200", chat data corresponding to each management ID, and answer type information "H" corresponding to each piece of chat data such that they are associated with each other. Furthermore, the answer data acquisition unit 215 continues to acquire similarly management ID included in the chat answer data, chat data corresponding to this management ID, answer type information of this chat data such that they are associated with each other until "I" is acquired as the answer type information. When the answer type information of "I" is acquired, the acquisition process is ended. Note that in a case where the acquired chat answer data does not include link information pointing to a management ID or the applicable model information page or the model selection page, the answer data acquisition unit 215 may end the process of acquiring chat data or the like.

That is, more specifically, in a case where chat data corresponding to the management ID "200" is retrieved as a result of a search performed in response to an input question sentence, as shown in FIG. 11, the answer data acquisition unit 215 acquires all management IDs shown in FIG. 11, chat data corresponding to each management ID, and answer type information of each chat data in association with each other.

The return answer data generation unit 216 generates return transmission data in which all management IDs, chat data corresponding to each management ID, answer type information of each chat data are integrated such that they are associated with each other, and the server apparatus 2 transmits the generated return answer data to the user terminal 4.

Then, the user terminal 4 displays screens such as screens 1302 to 1306 shown in FIG. 13 based on all received management IDs, chat data, answer type information, processing contents corresponding to the answer type information, and the user's selection on the chat data displayed on the user terminal 4. Then, when the user terminal 4 displays the screen 1306 according to the chat answer data corresponding to the management ID "203", since the answer type information of the management ID "203" is "I", the questionnaire screen 1307 is displayed based on the processing content shown in FIG. 12.

Thus, as described above, the server apparatus 2 transmits, to the user terminal 4, the chat data given in response to the question sentence input at the user terminal 4 and the data corresponding to the link information included in the chat data, collectively at a time, and thus, the user terminal 4 does not need to receive data from the server apparatus 2 each time the data is displayed, which makes it possible for the user to get the answer in a shorter time.

Note that the server apparatus 2 may not transmit all chat data at a time, but the server apparatus 2 may the chat data on a part-by-part basis.

More specifically, the answer data acquisition unit 215 of the server apparatus 2 acquires chat data corresponding to the management ID "200" as an answer to the question sentence input in the screen 1301, and further acquires answer type information "G". Then, the return answer data generation unit 216 generates return answer data in which the management ID "200", the chat data corresponding to the management ID, and the answer type information are associated with each other and integrated. The server apparatus 2 transmits this return answer data to the user terminal 4.

Then, the user terminal 4 displays the screen 1302 as shown in FIG. 13 based on the received management ID, chat data, answer type information, and processing contents corresponding to the answer type information. Furthermore, the user terminal 4 transmits the management ID "201" to the server apparatus 2 based on the user's selection contents on the chat data displayed on the user terminal 4, and the user terminal 4 further displays the screens 1303 to 1304 as shown in FIG. 13 based on the management ID, chat data, answer type information acquired from server apparatus 2, processing content corresponding to the answer type information acquired from the server apparatus 2.

These processes are performed repeatedly, in which when the user terminal 4 displays the screen 1306 as the chat answer data corresponding to the management ID "203", the answer type information corresponding to the management ID "203" is "I", and thus the questionnaire screen 1307 is displayed based on the processing content shown in FIG. 12.

That is, based on the link information selected by the user on the user terminal 4, the server apparatus 2 collectively transmits the management information associated with the link information, the chat data corresponding to the management ID, and the answer type information to the user terminal 4. Then, the user terminal 4 performs processing with the processing content corresponding to the answer type information on the received chat data, and displays the resultant chat data on the display unit.

Thus, the server apparatus 2 transmits only the chat data and answer type information based on the user's selection made at the user terminal 4 without transmitting chat data corresponding to the management ID that is not selected by the user, which makes it possible to reduce the data size transmitted, and makes it possible for the user to get the answer efficiently in a shorter time.

Note that since the user terminal 4 displays the chat data based on the processing content corresponding to the answer type information, it is allowed to change the display form of data displayed on the user terminal 4 simply by changing the processing content corresponding to the answer type information stored in the storage unit of the user terminal 4. That is, while not changing the chat data of the server apparatus 2, the processing content corresponding to the answer type information is downloaded to the user terminal 4 via the network or the like based on the specifications of the chat-based support system provided by the company, and thus it is possible to more easily realize a chat-type display form depending on each system providing company.

Note that the chat data stored in the chat data storage unit 201 and the FAQ data stored in the FAQ data storage unit 202 are not limited to question data and answer data related to the product inquired to the call center. The chat data and the FAQ data may be, for example, contents of questions asked from a certain department of a company to another department in the company and contents of answers to the questions.

that is, it is possible to provide a chat-based way of asking questions and answering them between different departments or sections in a company. That is, there is no particular restriction on the data content as long as the chat data and the FAQ data are described in a data format in which two types of data are paired together.

In appended Claims, an information processing apparatus corresponds to the server apparatus 2 according to the embodiment. Note that the information processing apparatus may be a user terminal 4. In this case, instead of the server apparatus 2, the user terminal 4 itself performs the processing described above. First question data corresponds to, for example, original question data. First answer data corresponds to, for example, original answer data. Second question data corresponds to, for example, chat question data. Second answer data corresponds to, for example, chat answer data. Product list data corresponds to, for example, model name list data such as a model information page, a support selection page for each model, a model selection page, or the like. A chat data acquisition unit corresponds to, for example, the question information search unit 212 described above.

The present disclosure contains subject matter related to that disclosed in Japanese Priority Patent Application JP 2018-171307 filed in the Japan Patent Office on Sep. 13, 2018 and Japanese Priority Patent Application JP 2019-044571 filed in the Japan Patent Office on Mar. 12, 2019, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   question information acquisition circuitry configured to acquire question information from a chat screen of a user terminal apparatus;
   a frequently asked questions (FAQ) data storage memory configured to store FAQ data including a plurality of pieces of first question data and a plurality of pieces of first answer data each corresponding to one of the plurality of pieces of first question data;
   a chat data storage memory configured to store chat data including one or more pieces of second question data each being a collection of one or more identical or similar pieces of first question data selected from the plurality of pieces of first question data included in the FAQ data and further including one or more pieces of second answer data obtained by simplifying an answer content of corresponding one or more pieces of first answer data, the one or more pieces of second question data each being associated with a piece of second answer data;
   chat data acquisition circuitry configured to acquire the chat data;
   answer data acquisition circuitry configured to acquire a piece of second answer data corresponding to a piece of second question data identical or similar to the question information; and
   transmission circuitry configured to transmit, to the user terminal apparatus, an instruction to the display on the chat screen the piece of second answer data acquired by the answer data acquisition circuitry, wherein:
   the answer data acquisition circuitry acquires link information corresponding to the piece of second question data identical or similar to the question information and acquires a piece of data including the piece of second answer data and the link information,
   the chat data further includes a piece of third question data different from the piece of second question data identical or similar to the question information, and a piece of third answer data corresponding to the piece of third question data,
   the answer data acquisition circuitry adds link information pointing to the piece of third question data to at least a part of a character string included in the piece of second answer data, and acquires, when the link information pointing to the piece of third question data is received from the user terminal apparatus, the piece of third question data and the piece of third answer data, and
   the transmission circuitry transmits, to the user terminal apparatus, an instruction to cause the chat screen to sequentially arrange and display the piece of third question data and the piece of third answer data under the piece of second question data.

2. The information processing apparatus according to claim 1, wherein:
   the FAQ data further includes a plurality of pieces of model name information associated with the respective pieces of first question data,
   the information processing apparatus further comprises generation circuitry configured to acquire one or more pieces of first question data corresponding to the piece of second question data identical or similar to the question information and generate product list data listing model names described in respective one or more pieces of model name information associated with the acquired one or more pieces of first question data, and
   the answer data acquisition circuitry adds link information pointing to the product list data to the piece of second answer data.

3. The information processing apparatus according to claim 2, wherein the generation circuitry generates the product list data distinguishably describing a first model name group and a second model name group, the first model name group being associated with one piece of first question data included in the plurality of pieces of first question data corresponding to the piece of second question data identical or similar to the question information, the second model name group being associated with another one piece of first question data included in the plurality of pieces of first question data.

4. The information processing apparatus according to claim 1, wherein the transmission circuitry transmits the piece of second question data identical or similar to the question information to the user terminal apparatus.

5. The information processing apparatus according to claim 1, wherein the transmission circuitry is configured such that in a case where link information pointing to a piece of fourth question data being different from the piece of third question data and being included in the chat data is not added to any part of the character string included in the piece of third answer data, the transmission circuitry transmits data of a questionnaire screen to the user terminal apparatus.

* * * * *